(12) United States Patent
Mitchell et al.

(10) Patent No.: US 11,716,413 B2
(45) Date of Patent: Aug. 1, 2023

(54) SYSTEM AND METHOD OF MONITORING RESILIENCE AND SAFETY OF ELECTRONIC DEVICES DURING TESTING

(71) Applicant: T-MOBILE USA, INC., Bellevue, WA (US)

(72) Inventors: Michael Mitchell, Bellevue, WA (US); Peter Myron, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/165,268

(22) Filed: Feb. 2, 2021

(65) Prior Publication Data

US 2022/0247853 A1 Aug. 4, 2022

(51) Int. Cl.
*H04B 17/00* (2015.01)
*H04M 1/24* (2006.01)

(52) U.S. Cl.
CPC .................................... *H04M 1/24* (2013.01)

(58) Field of Classification Search
CPC ..... H04M 1/24; H01B 17/00; G01R 31/3025; G01R 31/3163; H04B 17/15; H04B 17/23; H04B 17/29
See application file for complete search history.

(56) References Cited

U.S. PATENT DOCUMENTS

| | | | | |
|---|---|---|---|---|
| 5,309,352 A | * | 5/1994 | Stubbs ................... | G05B 15/02 702/108 |
| 2016/0109485 A1 | * | 4/2016 | Haefner ................... | G01R 1/36 324/750.03 |
| 2017/0109766 A1 | * | 4/2017 | Percy ..................... | G01S 5/0294 |
| 2018/0124150 A1 | * | 5/2018 | Myron ................... | H04W 24/06 |
| 2020/0010190 A1 | * | 1/2020 | Konishi ................ | B64C 39/024 |
| 2020/0203783 A1 | * | 6/2020 | Ringuette .......... | G01R 31/3644 |
| 2022/0099749 A1 | * | 3/2022 | Wang ................... | G01R 31/389 |

* cited by examiner

*Primary Examiner* — Tuan Pham
(74) *Attorney, Agent, or Firm* — Marshall, Gerstein & Borun LLP

(57) ABSTRACT

Systems and methods for monitoring mobile devices in a controlled environment are provided. One or more mobile devices may be accessible through a communication port of the mobile device. One or more monitoring devices may be configured to monitor the one or more mobile devices. A processor in communication with the one or more monitoring devices may control the monitoring devices and receive signals from the monitoring devices. A server in communication with the mobile devices may create a communication channel with each of the mobile devices, with each communication channel accessible through a network for use by software developers and testers. Thus, monitoring and detection of malfunctions or other abnormalities of the mobile devices is achieved, and remediation may be performed.

19 Claims, 8 Drawing Sheets

SYSTEM AND METHOD OF MONITORING RESILIENCE AND SAFETY OF ELECTRONIC DEVICES DURING TESTING

FIELD OF THE DISCLOSURE

The present disclosure generally relates to monitoring electronic devices and, more particularly, to monitoring devices in a device test farm.

BACKGROUND

Testing is an important part of software development. In many environments, software testing is performed automatically, using test scripts. A test script is a sequence of instructions and/or specifications that exercise a target application, typically by providing inputs and verifying that the corresponding outputs are as expected. A developer may require testing software on specific devices which typically requires a person to be in possession of the device. Therefore, a developer may have remote access to an array of devices for testing software remotely on various types of devices.

Device test farms may be employed to allow for remote software testing of different types of user equipment (UE) such as smart phones, tablets, and other mobile devices. Test farms use software to provide telemetry data such as device speeds, operational status, battery charge status, etc. while a given device is being tested. Testing of UEs may include running an application or software on a UE, performing an update or patch on the UE, or other software or application-based tests. Existing test farms do not provide feedback or information regarding problems with the physical hardware of the UEs, whether information or graphics are displayed correctly by the UEs, or other visual and physical measures of the performance of the UEs.

SUMMARY

Systems and methods for monitoring devices (e.g., a smartphone, tablet, laptop, etc.) in a test farm are provided herein. In an example, one or more external sensors may be positioned to monitor the devices such as a smoke sensor, a camera, a sound sensor, or another type of sensor or sensing device. The sensors may monitor the test devices to determine functionality of the test devices, such as whether specific test devices are on, off, running an app, overheating, etc. When the sensor detects the malfunction of a device, a notification may be generated to present to a user for the user to take further action in response to the malfunction. The system may include a processor in communication with the one or more sensors, and the processor may determine the malfunction of a test device from data received from the sensor. Based on the determination of a malfunction, the processor may perform correction actions such as turning off a device, starting an app, or another corrective action.

In implementations, the one or more sensors may be integrated into test devices of the test farm. For instance, the camera of a first smartphone may be configured to capture images on another smartphone in the test farm. Such a configuration could allow for multiple test devices to monitor each other for determining the functionality of devices in the test farm, which also reduces the need for external sensors.

A user interface may present to a user the status of one or more test devices of a test farm. For example, a plurality of test devices may be presented in a list with one or more statuses presented. Some examples of statuses include power on/off, temperature of the device, current drawn by the device, battery charge, battery swell status, etc. Further, the user interface may provide images and video of one or more test devices for monitoring of the one or more test devices.

In one aspect, a system for monitoring mobile devices in a controlled environment is provided, the system comprising: one or more mobile devices located at a first location, each mobile device configured to operate as part of a cellular communications network, each mobile device having a communication port, and each mobile device having a logical control interface that is accessible through the communication port of the mobile device; one or more monitoring devices configured to monitor the one or more mobile devices, each of the monitoring devices being at the first location; a processor in communication with each of the one or more monitoring devices, the processor being configured to control the monitoring device and further configured to receive signals from the monitoring device; and a server, the server being configured to provide communication to one or more communication ports corresponding to each of the mobile devices, wherein the server is configured to create a communication channel with each of the mobile devices, and wherein the communication ports are accessible through a communications network for use by software developers and testers.

In another aspect, a method of monitoring a mobile test device is provided, the method comprising: configuring a monitoring device to monitor the mobile test device; communicating with one or more communication ports of the mobile test device to control the mobile test device during testing; collecting a signal from the monitoring device during testing, the signal being indicative of a status of the mobile test device; determining from the collected signal, a status of the mobile test device; determining whether the status of the mobile test device is within an acceptable threshold; and when the status of the mobile test device is not within an acceptable threshold, implementing a corrective action related to the mobile test device.

In still another aspect, a tangible, non-transitory computer-readable medium is provided, storing executable instructions for monitoring a mobile test device that, when executed by one or more processors of a computer system, cause the computer system to: configure a monitoring device to monitor the mobile test device; communicate with one or more communication ports of the mobile test device to control the mobile test device during testing; collect a signal from the monitoring device during testing, the signal being indicative of a status of the mobile test device; determine a status of the mobile test device from the collected signal; determine whether the status of the mobile test device is within an acceptable threshold; and when the status of the mobile test device is not within an acceptable threshold, implement a corrective action related to the mobile test device.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Disclosed is a system and method for detecting device malfunctions of electronic devices in a test farm that are unable to be detected and reported through telemetry reporting. The malfunctions may include hardware and user equipment (UE) issues, which may include, without limitation, any of the following: screen malfunction, battery malfunction, battery swelling, overheating, combustion, explosion, fire, power outage, user interface display errors, or another malfunction. A test farm may be outfitted with a plurality of sensors such a camera, smoke detector, chemical sensor, IR camera, etc. to monitor the devices. Further, some UE such as a mobile device may be configured to monitor other UE in the test farm. As such, some implementations may only require physically configuring at least some of the UE to monitor other UE being tested.

The described implementations provide systems and methods that allow developers and testers to access banks or clusters of devices and simultaneously monitor the UE and hardware during testing. One or more sensor are implemented to monitor the UE in the test farm, and communications with the UEs and sensors is facilitated by one or more interface devices and one or more server computers. Each interface device has one or more communication ports (e.g., a universal serial bus port, wireless communications card, etc.). Each interface device is connected to corresponding test devices and the interface devices may also be connected to sensors. Each interface device also has a network communications interface, such as an Ethernet interface, which may be connected to a local network or a wide-area network such as the Internet.

A server computer is configured to communicate with the UE through the interface devices. The server may establish one or more communication channels with the interface devices to communicate with the UE and the sensors. The server computer may implement an Internet-accessible user interface (UI) through which developers may obtain access to individual test devices and sensors. The UI may, for example, display a list of available test devices and their characteristics, and any malfunctions or current states of the UE. For example, the UI may display a current temperate of a UE or if a UE has overheated during testing.

Figure 1:
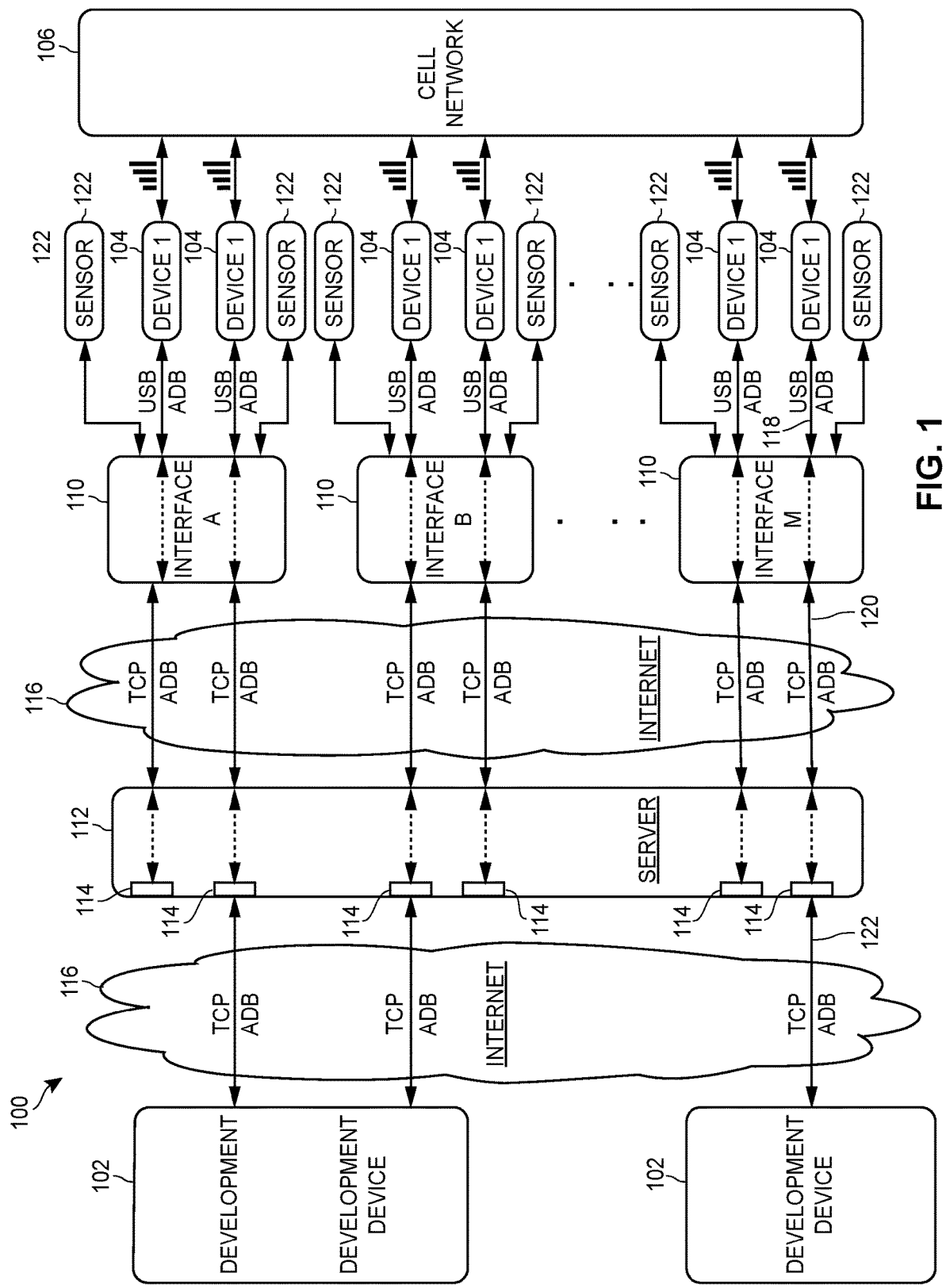
FIG. 1 is a block diagram of a testing environment that includes multiple test devices that are accessible through a network by one or more development devices.

FIG. 1 is an illustration of a testing environment 100 for testing UE such as smartphones, tablet computers, wearable technology, and other mobile devices. In some embodiments, the testing environment 100 may include aspects and elements of testing environments as described in U.S. Patent Publication No. 2018/0124150, which is incorporated herein by reference in its entirety. The testing environment 100 allows one or more development platforms or devices 102 to communicate with one or more remotely located UE test devices 104 and to perform testing and development on the test devices 104 as if the test devices 104 were co-located with the development devices 102. Further, the testing environment includes one or more monitoring devices 122 for performing monitoring of the test devices 104.

As an example, a cellular communications network provider may maintain a bank or cluster of the test devices 104, which may be located at a facility of a cellular communications network provider. The test devices 104 may comprise devices that have been or will be provided for use on a cellular communication network 106 of the provider. Such test devices may include devices that are currently available to consumers, devices that are in development for future release to consumers, and "legacy" devices that are no longer manufactured, produced, or sold, but which may still be in use by consumers. The test devices 104 may be mobile telephony devices, such as smartphones, or other types of computing devices having communication interfaces.

The development devices 102 may include computers and computer-based devices that are used to develop and test software for the test devices 104. For example, a development device 102 may comprise a desktop computer or other similar computer upon which has been installed software that facilitates writing and deploying code for the test devices 104. The development devices 102 may be (but need not be) at locations or facilities other than those of the cellular communications provider, such as the facilities of the developers or testers of device software. For example, the test devices 104 may be at a location in North America, while the development devices 102 may be in other world locations such as India, Europe, etc.

The monitoring devices 122 are configured to monitor the test devices 104 during operation and testing of the test devices 104. For example, a monitoring device 122 may include a temperature sensor and the monitoring device 122 may detect the temperature of a test device 104 during operation of the test device 104. The monitoring device 122 may be in communication with at least one of the development devices 102 to provide data indicative of the temperature of the test device 104 to the at least one of the development devices 102. The development devices 102 may have a display and the development devices may provide a visual indication of the temperature of the monitored test device 104. A user of the development devices 102 may observe the temperature on the display and may determine, from the temperature of the monitored test device 104, if the test device 104 is operating within an acceptable temperature range.

The monitoring devices 122 of FIG. 1 are configured to monitor the test devices 104, which may require that each monitoring device 122, or a sensor of the monitoring device 122, be physically in a same location or facility as a corresponding test device 104. The monitoring devices 122 may each independently be configured to monitor a temperature, smoke level, local pressure, a pressure change, physical strain, an electrical current, a power usage, an electrostatic charge, a chemical, or another property. In examples, a monitoring device may employ a chemical sensor to detect noxious chemicals, such as hydrogen fluoride, carbon monoxide, carbon dioxide, phosphorus pentafluoride, and phosphoryl fluoride. To monitor the test devices 104, each of the monitoring devices 122 may independently include a pressure sensor, chemical sensor, smoke sensor, thermal sensor, an ammeter, voltmeter, multimeter, an electric field sensor, LIDAR sensor, accelerometer, or another sensor for monitoring the test devices 104.

One or more of the monitoring devices 122 may include a camera configured to capture still frames, or video, of a test device 104. The camera may be configured to capture images of a display of the test device 104 to allow for a user of the development devices 102 to view the display to determine if elements of an app or program are being displayed correctly during testing of the test device 104. Further, a camera may be configured to capture images and/or video of a profile view of a test device 104 to monitor potential battery swelling of the test device 104. A camera of the monitoring devices 122 may include a charged coupled device (CCD), a complementary metal oxide semiconductor (CMOS) image sensor, an active-pixel camera, one or more photodiodes, or another sensor and/or device capable of detecting optical signals and/or images.

More than one of the monitoring devices 122 may be configured to monitor a single test device 104. Using the example of monitoring the test device 104 by imaging the test device, one monitoring device 122 may provide images of a display of the test device 104 while another monitoring device 122 may provide a profile image of the test device 122 to monitor battery swelling of the device. Similarly, in implementations, a first monitoring device 122 may monitor the temperature of the display of the test device 104 while another monitoring device 122 may monitor the temperature of a back plane or back of the test device 104 with the back plane being a surface of the test device 104 that is opposite the display.

A single monitoring device 122 may be configured to monitor multiple test devices 104. For example, the single monitoring device 122 may be configured to provide images or temperature information corresponding to more than one test device. In implementation, the field of view of a camera and/or sensor of the monitoring device 122 may include one or more test devices 104 enabling the monitoring of multiple test devices 104 simultaneously by the single monitoring device 122. In some embodiments, a single monitoring device 122 may be physically coupled to a rotation stage and/or a translation stage (e.g., conveyer, or other translation device) to enable the monitoring device 122 to rotate and/or translate to monitor a plurality of test devices 104. In some implementations, the monitoring device 122 may be stationary and a plurality of test devices 104 may be physically coupled to a rotating or translating device to physically move the test devices 104 through a field of view or monitoring range of the monitoring device 122 to allow the monitoring device 122 to monitor the test devices 104.

While illustrated as independent devices, the test devices 104 may each independently also be the monitor devices 122. For example, one of the test devices 104 may be a smart phone with a camera. The smart phone test device 104 may be physically configured to capture images of another test device of the test devices 104. As such, a device farm may employ the plurality of test devices 104 as the monitoring devices 122.

The monitoring devices 122 are communicatively coupled to the development devices 102 to provide signals indicative of a status or statuses of the test devices 104 to the development devices 102. The monitoring devices 122 may be communicatively coupled to the development devices 102 via multiple elements (e.g., servers, input/output interfaces, wired/wireless networks, etc.).

For performing testing of the test devices 104, the test devices 104 are provisioned to operate as part of the cellular communication network 106. In practice, the testing environment 100 may be implemented by a cellular communications provider for use by developers of software that will be used on communication devices sold by the provider, and the cellular network 106 may be a communication network implemented and provided by the same cellular communications provider. The test devices 104 may have SIMs (subscriber identity modules) that have been registered with the cellular communications provider for use on the cellular network 106. Accordingly, the test devices 104 may be configured to communicate using wireless cellular communication signals 108 with and over the cellular communication network 106. The cellular communication network 106 may in turn provide communications through wide-area networks such as the Internet. The monitoring devices 122 may also be provisioned to communicate via the cellular communication network 106 or other network to provide information of a status of one or more test devices 104 to another device.

The cellular communication network 106 also supports traditional cellular services such as voice calls, text messaging, and other functionality such as various IMS (IP multimedia subsystem) services. In certain implementations, the cellular communication network 106 may comprise a GSM (global system for mobile communications) network and may accordingly use various protocols and standards encompassed by the GSM standard.

In the described embodiments, each of the test devices 104 may operate using any one of several variants of the Android operating system, including variants intended for phones, tablets, wearable devices, laptop computers, etc., and including variants intended for devices of different manufacturers. Note that although the testing environment 100 is described in the context of the Android operating system and associated development tools, the described techniques can also be used in conjunction with devices that use other operating systems and development platforms. Various types of devices support remote debugging functionality and logical control interfaces and can be connected in ways similar to those described herein.

The development devices 102 may be configured for Android software development, such as by running an instance of an IDE (integrated development environment) designed for Android software development and testing. Android Studio is an example of such an IDE that is available for the Android platform. The Android platform and operating system support a debugging and development tool called Android debug bridge or ADB. ADB includes a communication stack that facilitates communications between a development device 102 (referred to as a client device) and a test device 104. Such communications may include TCP (transmission control protocol) communications. In addition, the ADB communications stack includes provisions for communicating using TCP over USB (universal serial bus). Android devices typically have USB communication ports and are configured to expose ADB functionality through their USB communication ports. The monitoring devices 122 may similarly communicate via a GSM network, TCP communications, and/or via a USB. As such, the monitoring devices 122 may communicate with the development devices 102 via a same or different communications channel as the test devices 104. In addition to defining transport-level mechanisms for communicating between a client and a test device, ADB defines a logical control interface (referred to herein as an ADB interface) that includes a command/query language and syntax for interacting with Android-based devices, allowing the client devices to control the devices for development and testing.

FIG. 1 shows a group of test devices 1 through N, which may be collectively considered as and referred to as a UE test device farm, or more simply as a device farm. A monitoring device 122 monitors a corresponding test device of the N test devices 104. The cellular communications provider may maintain and provide multiple test farms for various purposes and/or for various types or groups of developers and testers. Each test device 104 of the farm may have a wired communication port such as a USB port. In addition, each test device 104 may implement a logical control interface that can be accessed through the USB port for interacting with and controlling the test device. In certain embodiments, the logical control interface may comprise an ADB interface. In other embodiments, logical control interfaces may support remote debugging using different protocols. Further, each of the monitoring devices 122 may have a wired communication port (e.g., a USB port) and the monitoring device 122 may provide data to the development devices 102 via the USB port of the monitoring device 122. Additionally, the development devices 102 may provide control commands (e.g., turn on, turn off, initiate monitoring of a test device, halt monitoring of a test device, calibrate commands, change field of view commands, or other control commands) to the monitoring devices 122 through the USB port.

A web interface may be provided so that a developer may select and interact with available test devices 104 and monitoring devices 122. The web interface may provide access control and device brokering so that only authorized developers are able to use the test devices 104 and/or monitoring devices 122, and so that only one developer at a time is allowed to communicate with any particular test device 104 and/or monitoring device 122.

At the location where the devices 104 are located, each of the test devices 104 and monitoring devices 122 are connected by a communicative connection to an interface device 110. Each interface device 110 may comprise a diskless, single-board computer or controller having an Ethernet network port and one or more other wired communication ports such as USB device ports. Each interface device 110 may be configured and programmed by way of a code image that is stored on a removable memory card. For example, the interface device 110 may have a slot into which a removable SD memory card is inserted, and the code image for the interface device 110 may be stored on the SD memory card. The interface device 110 may be easily reconfigured by changing its memory card.

In the example shown by FIG. 1, each interface device 110 is connected to a corresponding test device 104 and monitoring device through a communication port of the respective test device 104 and monitoring device 122. Specifically, each interface device 110 may be connected by USB cables to USB communication ports of two test devices 104 and two monitoring devices 122, using respective USB communication ports of the interface device 110.

In addition to the components described so far, the environment 100 includes a server 112 that can be accessed by developers and by the development devices 102 for interacting with the test devices 104 and the monitoring devices 122. The server 112 provides a logical communication port or endpoint corresponding to each of the test devices 104 and monitoring devices 122. In the described embodiment, each endpoint comprises a TCP network communication port 114 and an associated ADB interface that can be accessed using the TCP communications mode of the ADB protocol. A TCP port such as this is defined by an IP (Internet protocol) address of the server 112 and a TCP port number, where the port number is unique for every test device 104 and monitoring device 122 that is accessed through a particular server 112.

In combination, the server 112 and the interface devices 110 are configured to create a communication channel corresponding to each test device 104. The communication channel for a particular test device 104 extends between the communication port of the test device 104 and the corresponding network communication port 114 of the server 112. The server 112 and the interface devices 110 may utilize the communication channel of a particular test device 104 to communicate with one or more monitoring devices 122 that are configured to monitor the particular test device 104. In embodiments, the server 112 and the interface devices 110 may create independent communication channels that are dedicated to communicating with each of the monitoring devices 122.

Communications between a development device 102 and a port 114 of the server 112 may be through a public communications network such as the Internet 116. Because the Internet has world-wide coverage, the development device 102 and the server 112 may be located at different geographic locations around the world. Communications between the server 112 and the interface devices 110 are used to create connections with the interface devices 110, corresponding to the respective test devices 104 and monitoring devices 122. In an embodiment, the connections may comprise TCP-based ADB connections.

The server 112 is configured to relay control communications between the port 114 and a TCP port (not shown) of the corresponding interface device 110. Similarly, the interface device 110 is configured to relay control communications between the server 112 and the devices 104, and between the server 112 and the monitoring devices 122. In embodiments, communication channels between the server 112 and the interface devices 110 are established using corresponding TCP ports on the server 112 and the interface devices 110.

Figure 2:
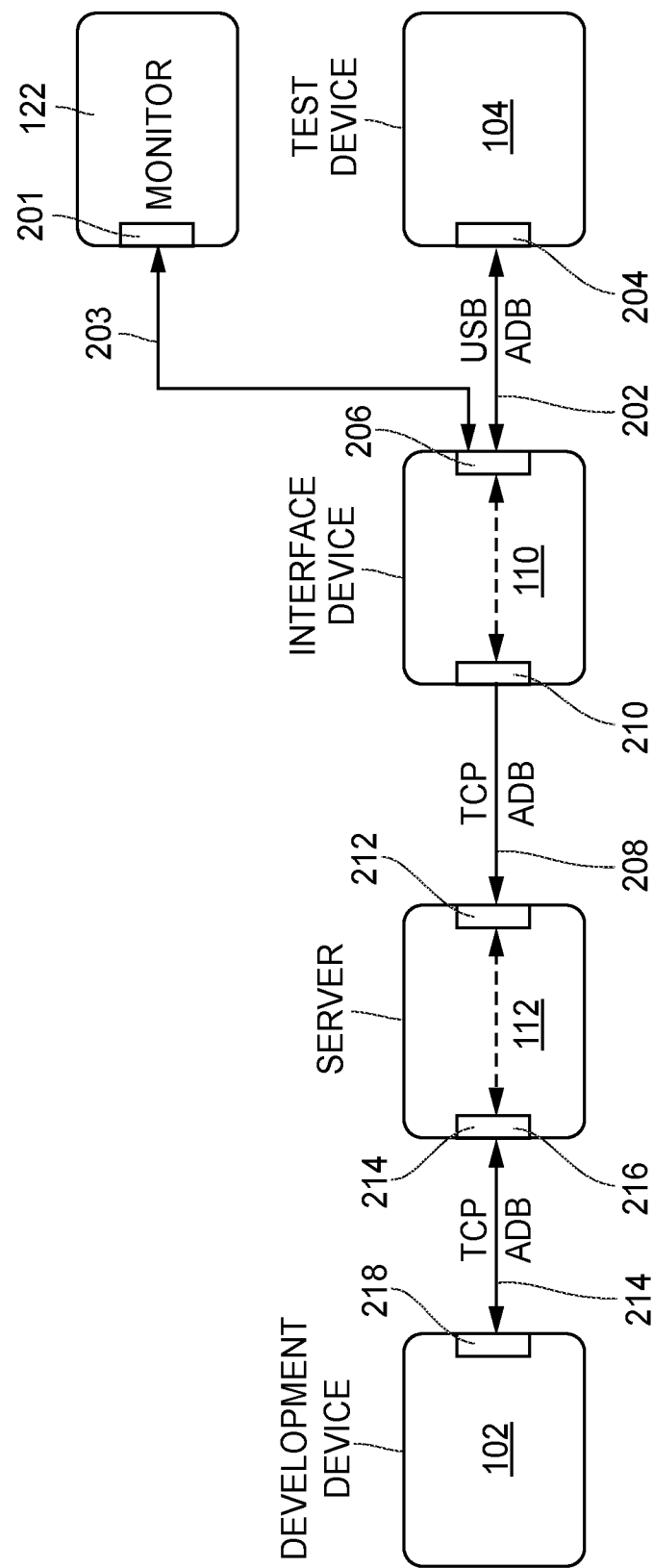
FIG. 2 is a block diagram showing further details of the testing environment in FIG. 1.

FIG. 2 illustrates further details regarding communication mechanisms that are used between a single development device 102, a single test device 104, and a single monitoring device 122. In the described embodiment, a communication channel, such as a TCP communication channel, is created for the test device 104 and the monitoring device 122. The test device 104 and the monitoring device 122 may share a communication channel, or a dedicated communication channel may be established for each of test device 104 and the monitoring device 122 independently. The communication channel(s) is then used for control communications, such as ADB communications. The communication channel(s) extends between the development device 102 and the test device 104, and between the development device 102 and the monitoring device 122, either directly, or through other components such as the server 114, and the interface device 110.

The communication channel(s) includes multiple TCP channel segments, which are used to communicate ADB commands, queries, and responses. A first TCP channel segment 202 is implemented over a wired USB connection between respective interfaces 204 and 206 of the test device 104 and the interface device 110. A monitor TCP channel segment 103 is implemented over a wired USB connection between respective interfaces 201 and 206 of the monitoring device 122 and the interface device 110. A second TCP channel segment 208 is implemented over a network connection between respective interfaces 210 and 212 of the interface device 110 and the server 112. A third TCP channel segment 214 is implemented over a network connection between respective interfaces 216 and 218 of the server 112 and the development device 102.

Each of the interfaces 201, 204, 206, 210, 212, 216, and 218 comprises both a physical interface and one or more logical interfaces. Specifically, each of the interfaces 204 and 206 may include a physical USB interface as well as logical TCP and ADB interfaces. Each of the interfaces 210, 212, 216, and 218 may have a physical Ethernet interface as well as logical TCP and ADB interfaces.

In embodiments, the monitoring device 122 may be at a same location as the test device 104 for the monitoring device 122 to monitor the test device 104. In other embodiments, a sensor of the monitoring device 122 may be at the same location as the test device 104, and other elements of the monitoring device (e.g., a memory, processor, communications chip or module, integrated circuits, etc.) may be at a location that is a different location than the location of the test device 104. The sensor may detect environmental or physical features of the test device 104, such as a temperature of the test device 104 or chemical composition of the environment of the test device 104, and the sensor may generate a signal indicative of the monitored feature. The sensor may provide the generated signal to other elements of the monitoring device 122 at the different location. The monitoring device 122 may then provide a signal indicative of the monitored feature to the development device 102 either directly, or via other elements such as the interface device 110 and the server 112.

Figure 3:
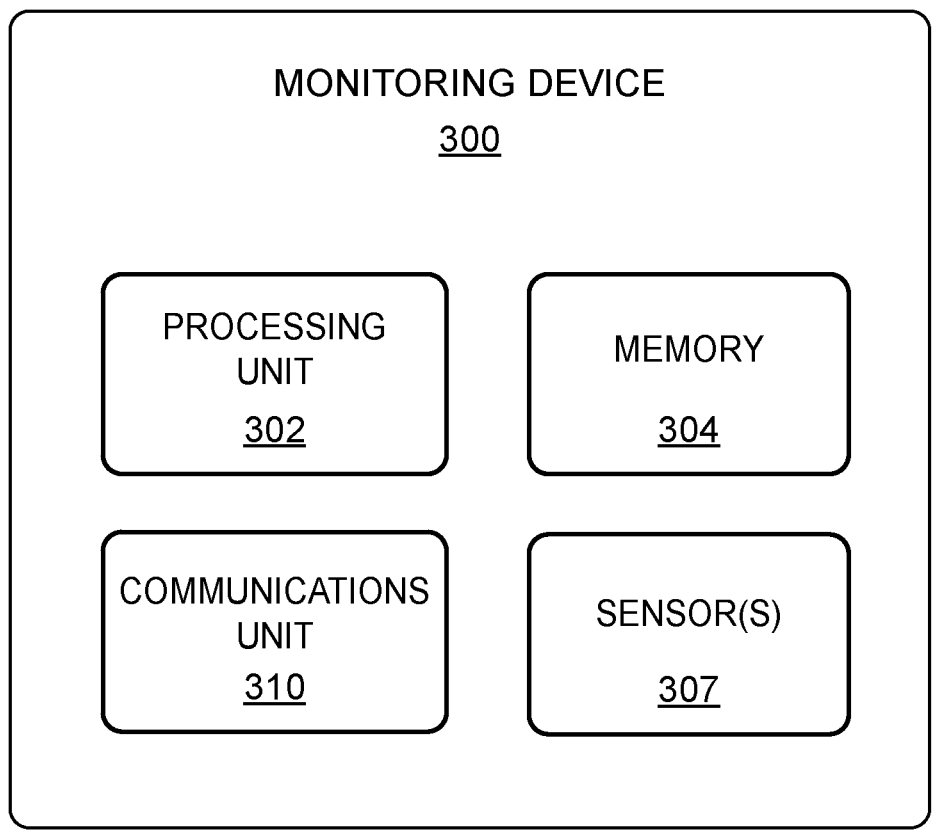
FIG. 3 is a block diagram of an example monitoring device that may be used in the environment of FIG. 1.

FIG. 3 is a block diagram of an example monitoring device 300 in accordance with various embodiments. The monitoring device 300 or FIG. 3 is illustrative of an embodiment of a monitoring device 122 as illustrated in FIGS. 1 and 2. The monitoring device 300 includes a processing unit 302, memory 304, at least one sensor 307, and communications unit 310.

The processing unit 302 may include one or more of a field programmable gate array FPGA, central processing unit (CPU), graphic processing unit (GPU), vision processing unit (VPU), neural processing unit (NPU), digitally signal processor (DSP), image signal processor (ISP), or another processor for performing the methods described herein.

In various embodiments, the memory 304 includes one or more machine-readable media, which may in turn include volatile and/or non-volatile memory. The memory 304 may also be described as non-transitory computer storage media and may include removable and non-removable media implemented by any method or technology for storing information. The memory 304 may store data in the form of computer readable instructions, data structures, program modules, data indicative of measurements performed by the sensor 307, data indicative of ambient environmental conditions, data indicative of maximum and/or minimum feature values, or other data. The memory 304 may store data that is indicative of one or more of an identification of the monitoring device 300, an identification or type of sensor of the sensor 307, an identification of one or more test devices monitored by the monitoring device 300, or other identification data.

Non-transitory computer-readable media of the memory 304 may include, but are not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by elements of the device 300 (i.e., the processor 302, communications unit 310, sensor 207, and any other potential elements). The processor 302 may be in communication with the memory 304 for the processor to retrieve and/or store data on the memory 304 and for the processor to perform machine readable instructions that are be stored on the memory 304.

The sensor 307 is configured to detect a feature of a test device, as described in reference to FIGS. 1 and 2. The sensor(s) 307 may be configured to detect one or more of a temperature, smoke level, local pressure, a pressure change, physical strain, an electrical current, a power usage, an electrostatic charge, a chemical, or another property of an environment and/or a test device. The sensor(s) 307 may include one or more of a pressure sensor, chemical sensor, smoke sensor, thermal sensor, an ammeter, voltmeter, multimeter, an electric field sensor, humidity sensor, dust sensor, particulate matter sensor (e.g., a $PM_{2.5}$ sensor, $PK_{10}$ sensor, etc.) or another sensor for monitoring the test devices 104. Further, the sensor(s) 307 may include one or more sensors configured to detect states of a room or environment of a test device, such as a door sensor, a motion sensor, an IR sensor, a sensor configured to detect an occupancy of a room, etc.

The processor 302 may be in communication with the sensor 307 and the processor 302 may be configured to control the operation of the sensor 307. For example, the processor 302 may control an on/off state of the sensor 307. The processor 302 may also query the sensor 307 for a measurement according to machine readable instructions that the processor 302 executes from the memory 304. In embodiments, the processor 302 may further control operational aspects of the sensor 307 such as a zoom amount for a camera sensor, or a rotation and/or translation for the sensor 307 as described in reference to FIGS. 1 and 2, to allow the monitoring device 300 to monitor multiple test devices.

The sensor 307 may be in communication with the memory 304 to store data indicative of measured features of an environment of test device on the memory 304. Further, the sensor may be in communication with the processor 302 and the processor 302 may obtain data from the sensor 307. The processor 302 may process the data for example by filtering (e.g., spatial filtering, frequency content filtering, low pass filtering, high pass filtering, color filtering, etc.), performing averaging, fitting, regressions, or other processing of the data. Additionally, the processor 302 may retrieve the data from the sensor 302 and further provide the data to the memory 304 to store the data, or processed data, in the memory 304.

In embodiments, the sensor 307 may be in direct communication with the communications unit 310 to provide the communications unit 310 with data. The communications unit 310 provides communications between the monitoring device 300 and other external devices. The communications unit 310 includes one or more communications interfaces. The one or more communications interfaces may include any one or more of an Ethernet interface, a wired local-area network (LAN), wireless local-area network (WLAN) interface, a near field interface, a DECT chip set, or an interface for an RJ-11 or RJ-45 port. A wireless LAN interface can include a Wi-Fi interface or a Wi-Max interface, or a Bluetooth® interface that performs the function of transmitting and receiving data via wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions such as communicating directly with nearby devices that are also, for instance, Bluetooth® or RFID enabled. The communications unit 310 may provide communications between the monitoring device 300 and a test device being monitored by the monitoring device, another sensor or monitoring device, or another device in an environment of the test device and/or monitoring device 300.

The communications unit 310 may further include one or more transceivers such as radio transceivers and interfaces that perform the function of transmitting and receiving radio frequency communications via an antenna through an electronic communication network, such as a cellular communication network of a wireless data provider. The radio interfaces may thus facilitate wireless connectivity between the monitoring device 300 and various cell towers, base stations and/or access points. The communications unit 310, the memory 304, or another part of the monitoring device 300 may have a subscriber identity module (SIM), which is a removable smart card used to identify a user of the monitoring device 300 to a service provider network. The communications unit 310 may have one or more USB ports that provides communications with clients and peripheral devices. A USB port of the monitoring device 300 may also serve as a battery charging port.

The monitoring device 300 of FIG. 3 may include additional, alternative, or fewer elements than are illustrated in FIG. 3. For example, as previously mentioned, the monitoring device may itself be a test device. The monitoring device 300 may be a smart phone, tablet, dedicated user interface, or other device. In embodiments, the monitoring device may include a display such as a liquid crystal display, e-ink display, or any other type of display for displaying indicia. The display may be a touch-sensitive display screen, which may also act as an input device or keypad, such as for providing a soft-key keyboard, navigation buttons, or the like.

In embodiments, the monitoring device 300 may include output devices such as such as a display, speakers, a vibrating mechanism, or a tactile feedback mechanism. The output devices may also include ports for one or more peripheral output devices, such as headphones, peripheral speakers, or a peripheral display. Further, the monitoring device 300 may include input devices such as a microphone, a keyboard/keypad, or a touch-sensitive display. A keyboard/keypad may be a push button numeric dialing pad, a multi-key keyboard, or one or more other types of keys or buttons, and may also include a joystick-like controller and/or designated navigation buttons, or the like. In embodiments, the communications unit 310 may be configured to provide communications with input/output devices that are located at a remote location. For example, an output device in the form of a display, and an input device in the form of a keyboard, may be at a location of the development device 102 of FIGS. 1 and 2 and the communications unit 310 may provide communications between the monitoring device 300 and the remote input/output devices.

Figure 4:
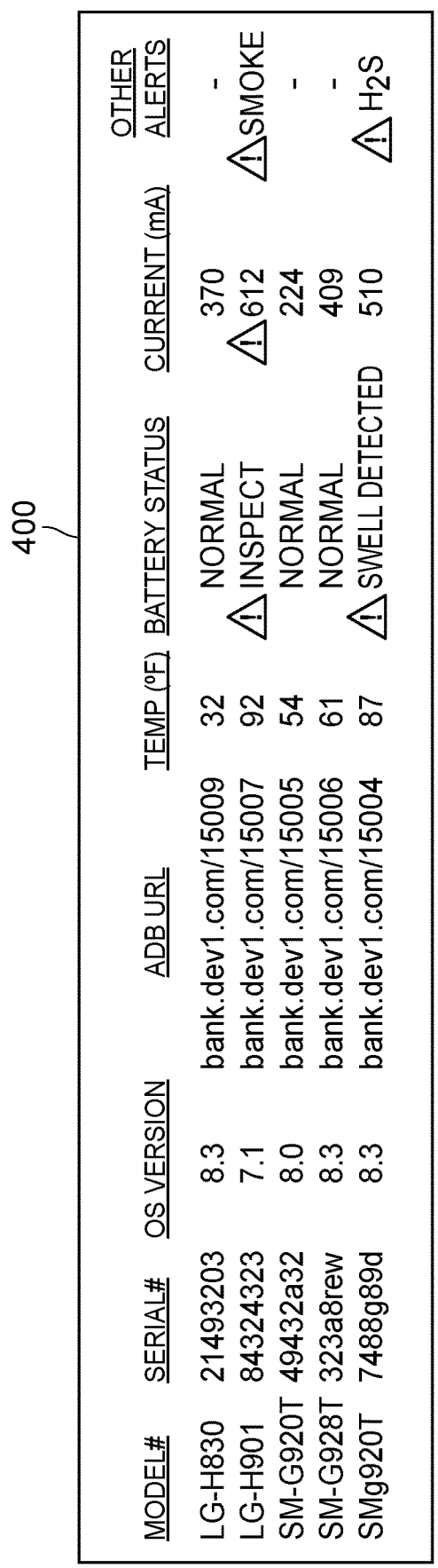
FIG. 4 shows an example of a user interface that may be presented to show characteristics and statuses of test devices.

FIG. 4 illustrates an example of a web-based user interface (UI) table 400 that may be provided by the server 112 of FIG. 1, and which may be accessed by a developer through a local network or via the Internet. The illustrated UI table 400 is an example of many different configurations and types of interfaces that may be implemented by or in conjunction with the server 112 for monitoring the test devices 104.

In the illustrated example, the UI table 400 is configured to list the test devices 104 of a cluster. More specifically, the UI 400 presents a listing of available test devices 104, where the listing shows the characteristics of each test device. The table 400 has multiple columns, where each column specifies a characteristic of an available test device 104. In this example, the columns correspond to the device model number, the device serial number, and the operating system version of the device. The table 400 also has a column showing a port specification corresponding to each test device 104. The port specification includes a port number of the server-provided communication port corresponding to the test device. In some cases, the port specification may be part of a URL through which the logical control interface of the test device may be accessed. In some cases, the URL or port specification may be revealed to a requesting developer only after the test device has been allocated or assigned to that user. In embodiments, the listing may include a device manufacturer, model, model release date, size of installed memory, serial number, operating system version, physical location of the device, the cellular communication provider for which the device has been provisioned, and so forth.

The table 400 also includes status columns with indications of the statuses of the test devices 104 that are monitored by the monitoring devices 122. The table 400 may include, for example, a temperature, battery status (e.g. swelling, electrical shorting, battery overheating, etc.), an electrical current draw, power usage, detected chemical presence, detected smoke presence, a humidity level, or another monitored feature of an environment or device. In embodiments, limits may be defined to determine malfunction or cause an alert to be displayed in the table 400. For example, an alert may be triggered and displayed for any device 104 that draws more than 550 mA, or for a device that exceeds a certain temperature. Further, a chemical alert may be triggered and displayed if a detected level of hydrogen sulfide ($H_2S$) exceeds a certain amount.

In embodiments, an alert may be triggered for a manual inspection of a test device 104 under certain conditions, such as if there is a regulation in the battery such as swelling of the battery. The detection of operation outside of a set of operational bounds may cause the development device, or another device, to halt the operation of a malfunctioning test device, or to automatically power down the malfunctioning test device. In embodiments, the table 400 may provide an alert to a use of the UI table 400 to allow the user to debug the malfunctioning device, manually halt operation of the device, and/or manually power down the device.

Figure 5:
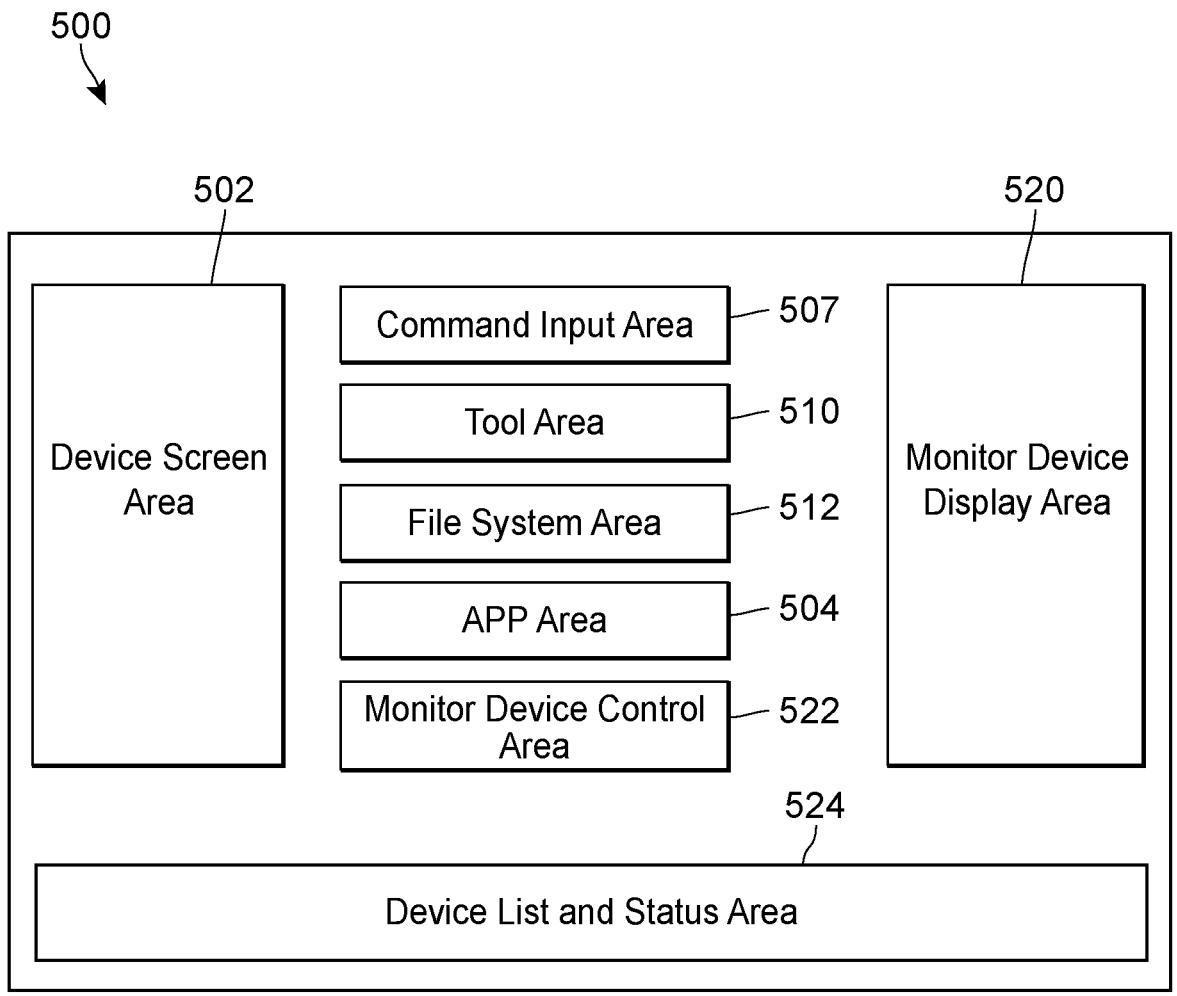
FIG. 5 shows an example of a user interface that may be presented to provide functionality for accessing and monitoring test devices.

FIG. 5 shows an example of a web-based UI 500 that may be provided by the server 112 to provide additional functionality for accessing and monitoring individual test devices 104, without necessarily involving the use of a development device 102. For example, the UI 500 may allow a user to interact with and control a selected test device 104. Specifically, the UI 500 may include a screen area 502 in which is displayed a live version of the screen of the test device 104. The screen area 502 may also allow the user to interact with the device by providing screen selection and other inputs to the device.

The UI 500 may include an application area 504 that may be accessed by a user to upload and install an application on the test device 104, as well as to view and manage other applications that are installed on the test device. The screen area 502 and the application area 504 may be used to run an application, to observe the output display of the application, and to interact with the application by providing navigational inputs.

The UI 500 may further include a command area 507 that may be used to send commands to the test device. For example, a user may provide typed script commands to the test device through the command area 507, or the user may upload a script or other list of commands and send the commands to the test device through the command area 507. The UI 500 may also include a tools area 510 that provides a user with a plurality of development tools and tests to perform on the test device.

The UI 500 may include a monitor device display area 520 that provides a user with a live video feed of the test device. The device display area 520 is provided by a monitoring device such as any of the monitoring devices 122 of FIGS. 1 and 2. The device display area 520 may provide photos or live video of a display of the test device such that a user may compare the display of the device screen area 502 with a captured image, or video, displayed by in the monitor device display area 520. Therefore, a user may identify display errors of the test device through comparing the images of the device screen area 502 and the monitor device display area 520. The monitor device display area 520 may provide a user with a profile image of the test device for a user to identify swelling of a battery, or the monitor device display area 520 may provide a different view of the test device for monitoring of the test device. In embodiments, the monitoring device display area 520 may provide images or video of an environment of a test device to monitor the environment of the test device, such as, for determining if there is smoke in an environment or being produced by a test device. Further, the monitor device display area 520 may provide a user with images or video of a single test device, or multiple test devices.

The UI 500 may include a monitor device control area 522 to provide a user with commands or controls for controlling a monitor device. The monitor device control area 522 may allow a user to turn off a monitor device, to turn on a monitor device, to determine a monitor device that provides the images to the monitor device display area 520, to select types of sensors or monitoring devices to activate, or to query a sensor of a monitor device for a measurement. In embodiments, the monitoring device may be able to be rotated, translated, or otherwise moved to change the view of a test device, to change from monitoring one test device to monitoring a different test device, to change monitoring of one test device to a plurality of test devices, to change monitoring of a plurality of test devices to include at least one more or less test device, or to change monitoring of a first plurality of test devices to monitoring of a second plurality of test devices. For example, the monitor device control area 522 may allow a user to activate a conveyer belt that translates a monitoring device to change the monitoring of one test device to monitor a different test device.

The UI may also include a device list and status area 524 that provides a list of test devices and information and status indications corresponding to each of the listed test devices. For example, the device list and status area 524 may provide a list such as the list 400 of FIG. 4. The monitor device control area 522 may allow for a user to select the type of information that is listed in the device list and status area 524. Further, a user may select a device to monitor and view on the monitor device display area 520 and the device screen area 502 by selecting the device in the list of the device list and status area 524.

Figure 6:
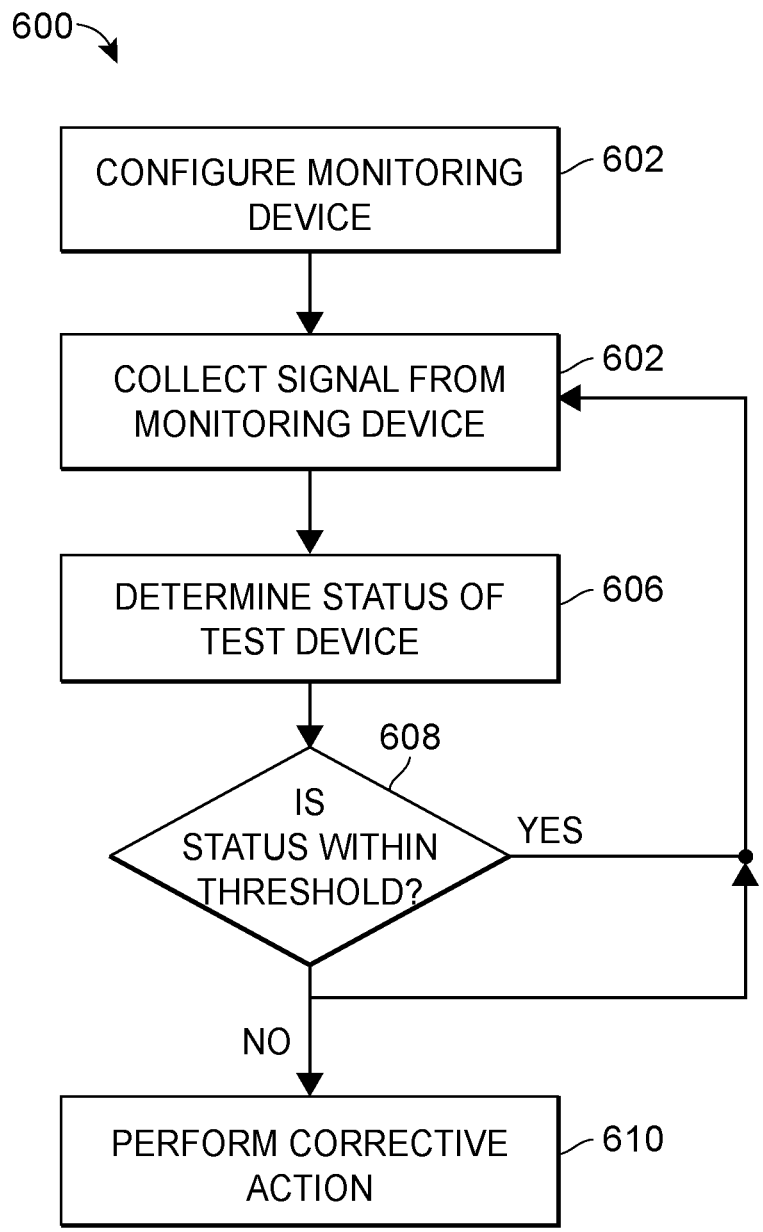
FIG. 6 is a flow diagram of an example method for monitoring a test device.

FIG. 6 is a flow diagram of an example method 600 for monitoring a test device. The method 600 may be implemented in the environment described above with respect to FIGS. 1 and 2, although the method 600 may also be performed in ways and in environments other than those explicitly described herein.

The method 600 includes configuring a monitoring device to monitor a test device at block 602. The monitoring device may include one or more sensors such as an imaging sensor, a pressure sensor, a chemical sensor, a smoke sensor, a thermal sensor, or another sensor. The method 600 further includes collecting a signal from the monitoring device at block 604. The signal is indicative of a status of the test device. For example, the signal may include a digital video signal that may be processed to provide image and/or video of the test device. The signal may be indicative of a temperature of a test device, or the signal may be indicative of another status of the test device of an environment of the test device.

The status of the test device is determined based upon the data from the monitoring device at block 606. The status may be determined by a processor configured to receive the signal from the monitoring device configured to monitor the test device, with the processor further configured to process the signal to determine the status of the test device. For example, the status of the test device may include a chemical content of an environment of the test device, and the processor may be configured to process the signal to determine a percentage or other metric indicative of the chemical content of the environment. Further, the status may include an image or video of the test device to be provided to a user.

The status of the test device is then determined to be within a set of threshold values at block 608. For example, a set of acceptable temperature values may be determined for a test device, and the status of the test device may be determined to be within, below, or exceeding the acceptable temperature values. In embodiments, a user may be provided with the determined status, and the user may determine whether the status is within an acceptable threshold. In some embodiments, a processor may compare the determined status to a set of acceptable values to determine in the status is within the acceptable threshold. For example, a processor may perform image processing on an image to determine if smoke exists within a region of an image, or if a battery of the test device has swelled beyond an acceptable amount. Similarly, a user may observe images or video of the test device to determine if smoke is present in the image or if a battery has swelled.

If the determined status is within the acceptable threshold then the method 600 collects another signal at block 604 to monitor a same status or a different status of the test device. In embodiments, the method 600 may determine multiple statuses simultaneously or in series. If the determined status is not within the acceptable threshold, then the method 600 collects another signal at block 604, and a corrective action is performed at block 610. The corrective action may include powering down a test device, changing a temperature setting of an air conditioning or cooling device, stopping operation of an app on a test device, commanding a test device to run an app, operating a ventilation device such as a fan or air filter, or another corrective action. In embodiments, the corrective action may be performed by a user or by a processor. Thus, some embodiments may include notifying or alerting a user, which notification may be part of the corrective action.

Figure 7:
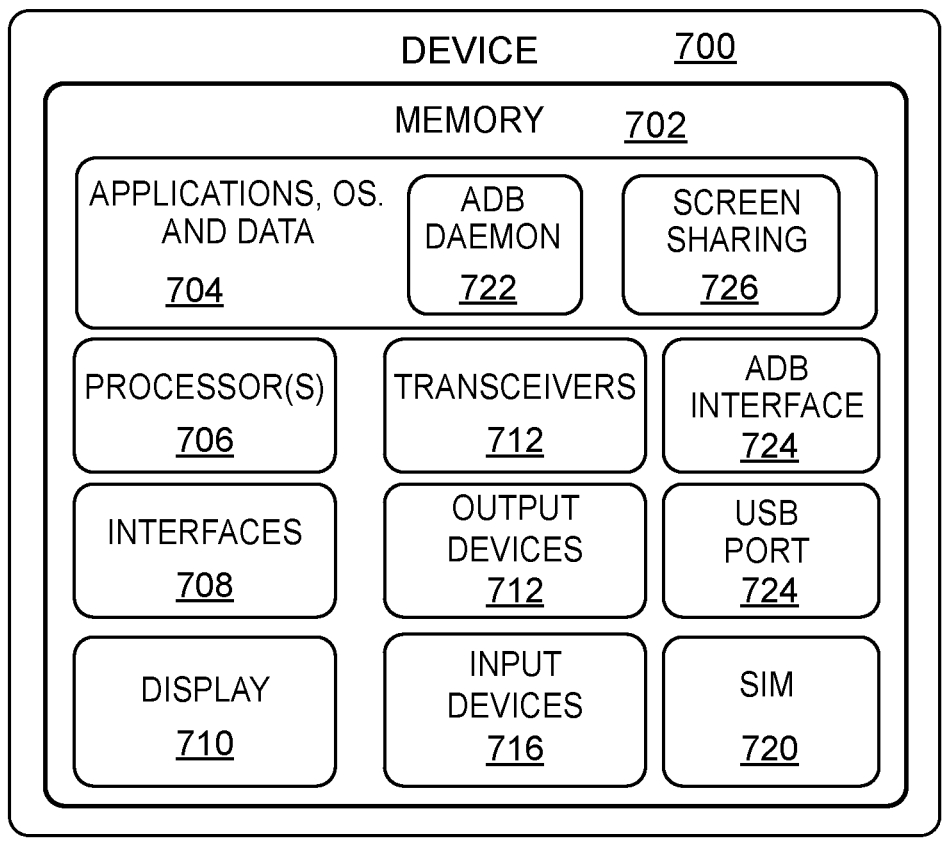
FIG. 7 is a block diagram illustrating an example of high-level components of a test device in the environment of FIG. 1.

FIG. 7 illustrates an example communication device 700 in accordance with various embodiments. The device 700 is illustrative of a test device 104. The device 700 may include memory 702, which may store applications, an operating system (OS), and data 704. The device 700 further includes processor(s) 706, interfaces 708, a display 710, radio transceivers 712, output devices 714, and input devices 716. In various embodiments, the memory 702 comprises one or more machine-readable media, which may in turn include volatile and/or non-volatile memory. The memory 702 can also be described as non-transitory computer storage media and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 700. In some embodiments, the processor(s) 706 is a central processing unit (CPU), a graphics processing unit (GPU), or both CPU and GPU, or other processing unit or component known in the art.

In various embodiments, the interfaces 708 are any sort of interfaces known in the art. The interfaces 708 may include any one or more of an Ethernet interface, wireless local-area network (WLAN) interface, a near field interface, a DECT chip set, or an interface for an RJ-11 or RJ-45 port. A wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 710 may comprise a liquid crystal display or any other type of display commonly used in telecommunication devices or other portable devices. For example, the display 710 may be a touch-sensitive display screen, which may also act as an input device or keypad, such as for providing a soft-key keyboard, navigation buttons, or the like.

The transceivers 712 may include any sort of transceivers known in the art. For example, the transceivers 712 may include radio, radios, and/or radio transceivers and interfaces that perform the function of transmitting and receiving radio frequency communications via an antenna, through a cellular communication network of a wireless data provider. The radio interfaces facilitate wireless connectivity between the device 700 and various cell towers, base stations and/or access points.

The output devices 714 may include any sort of output devices known in the art, such as a display (already described as display 710), speakers, a vibrating mechanism, or a tactile feedback mechanism. The output devices 714 also include ports for one or more peripheral devices, such as headphones, peripheral speakers, or a peripheral display. In various embodiments, the input devices 716 include any sort of input devices known in the art. For example, the input devices 716 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 700 may have a USB port 718 that provides communications with clients and peripheral devices. The USB port 718 may also in some cases serve as a battery charging port. The device 700 may have a SIM 720, which is a removable smart card used to identify a user of the device 700 to a service provider network.

In some embodiments, the Applications, OS, and data 704 may include an ADB daemon 722, which is an application that runs as a background process to respond to ADB commands. The ADB daemon 722 creates and communicates through an ADB interface 724, which is accessible through the USB port 718. The Applications, OS, and data 704 may also include a screen sharing application 726, which is another application that runs as a background process to allow an external device to emulate the screen output and touch-screen input of the device 700. The server 112 may have a corresponding application that is capable of displaying the content of the screen of the device 700 on a web interface, of detecting user input at the web interface, and providing the user input back to the device 700.

Figure 8:
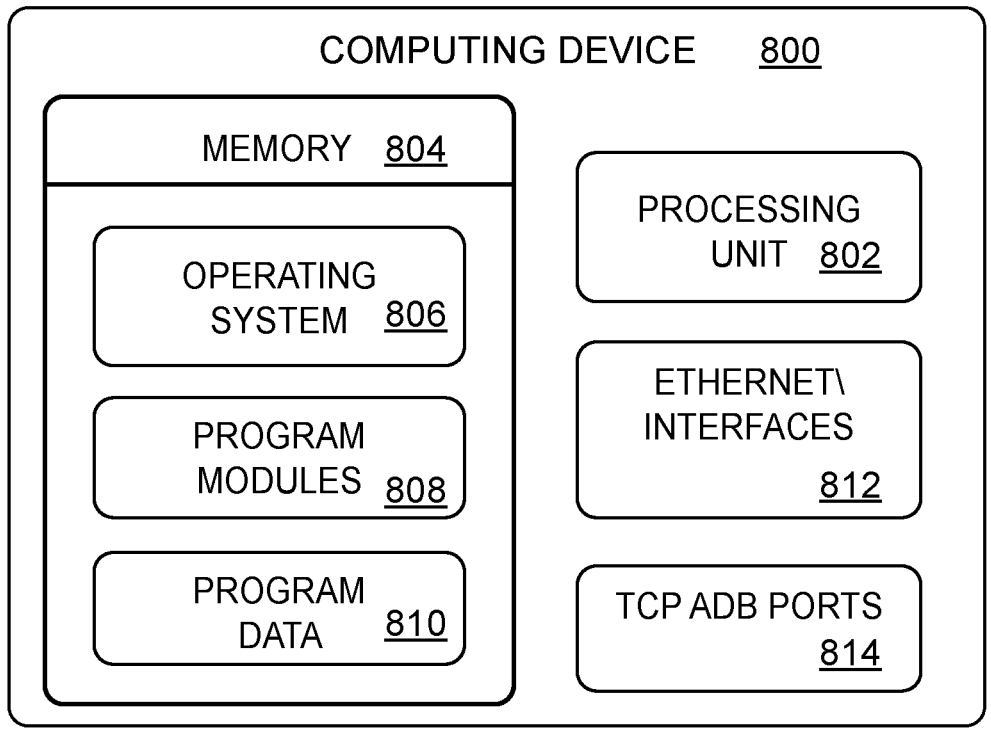
FIG. 8 is a block diagram illustrating an example of high-level components of a computing device that may be used as a server computer in the environment of FIG. 1.

FIG. 8 is a block diagram of an illustrative computing device 800 such as may be used to implement the server 112. In various embodiments, the computing device 800 may include at least one processing unit 802 and memory 804. Depending on the exact configuration and type of computing device, the system memory 804 may be volatile (such as RAM), non-volatile (such as ROM, flash memory, etc.) or some combination of the two. The memory 804 may include an operating system 806, one or more program modules 808, and may include program data 810. The memory may also include data storage devices (removable and/or non-removable) such as, for example, magnetic disks, optical disks, or tape.

The memory 804 may comprise non-transitory computer storage media. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. In various embodiments, the memory 804 may store programming instructions which, when executed, implement some or all of the function functionality described above as being implemented by the server 112, for operation of a monitoring device, and for monitoring a test device as described herein.

The computing device 800 may have one or more Ethernet interfaces 812, which may be used for connecting to a wide-area network such as the internet. As described above, the computing device 800 may create and expose multiple TCP-based ADB ports 814 for communications with external devices such as the development devices 102, the interface devices 110, and the monitoring devices 122. The computing device 800 may have various other elements such as a keyboard, a mouse, a touch-sensitive display, voice input device, etc. Output device(s) such as a display, speakers, a printer, etc. may also be included.

Figure 9:
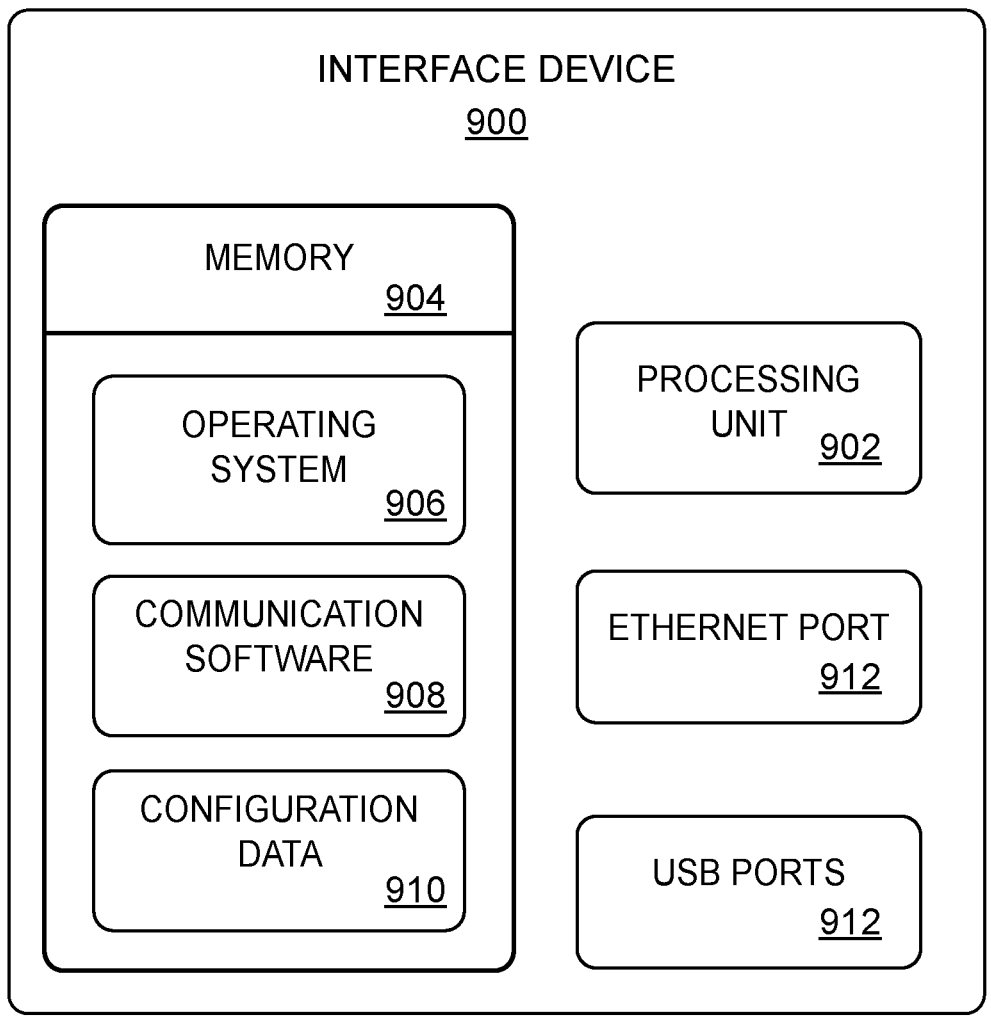
FIG. 9 is a block diagram illustrating an example of high-level components of an interface device as may be used in the environment of FIG. 1.

FIG. 9 illustrates an example implementation of an interface device 900, such as the interface device 110 of FIG. 1. FIG. 9 shows various high-level components and systems of such an interface device. The components may include at least one processing unit 902 and associated memory 904. In the described embodiment, the memory includes a removable, non-volatile memory card such as may be implemented using flash memory technologies. Such a removable memory card may be used to store a code image in order to configure operation of the interface device 110.

Generally, the memory 904 comprises non-transitory computer storage media of various types. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology. In various embodiments, the memory 904 may store programming instructions which, when executed by the processing unit 902, implement some or all of the function functionality described above as being implemented by the interface device 110.

More specifically, the memory 904 may include an operating system 906 and various other software. As a specific example, FIG. 9 shows communication software 908 such as may be used to communicate with the server 112, the test devices 104, and the monitoring devices 122. The memory 904 may also contain various types of configuration data 910. The interface device 900 may have an Ethernet interface 912 for communications with the server 112 over a wide-area network such as the Internet. The interface device 110 may have multiple USB ports 914 for communication with the test devices 104.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for using automated mobile computing device testing to ensure that a given targeted message is actually appearing in an intended manner for various types of intended recipients. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A system for monitoring mobile devices in a controlled environment, comprising:
   one or more mobile devices located at a first location, each mobile device configured to operate as part of a cellular communications network, each mobile device having a communication port, and each mobile device having a logical control interface that is accessible through the communication port of the mobile device;
   one or more monitoring devices comprising an imaging sensor configured to monitor the one or more mobile devices, each of the monitoring devices being at the first location;
   a processor in communication with each of the one or more monitoring devices, the processor being configured to control the monitoring device and further configured to receive signals from the monitoring device, and wherein the processor is further configured to, for each of the one or more mobile devices:
      communicate with the communication port of the mobile device to control the mobile device during testing;

collect a signal from each monitoring device during testing, the signal being indicative of a status of the mobile device based upon an image captured by the imaging sensor;

determine a battery swell status of the mobile device associated with the signals collected from the one or more monitoring devices;

determine whether the battery swell status of the mobile device is within an acceptable threshold; and when the battery swell status of the mobile device is not within an acceptable threshold, implement a corrective action related to the mobile device; and a server, the server being configured to provide communication to one or more communication ports corresponding to each of the mobile devices, wherein the server is configured to create a communication channel with each of the mobile devices, and wherein the communication ports are accessible through a communications network for use by software developers and testers.

2. The system according to claim 1, wherein the monitoring device associated with at least one of the mobile devices is a second mobile device.

3. The system according to claim 1, wherein the one or more monitoring devices are configured to generate a signal indicative of a malfunction of the one or more mobile devices and to provide the signal to the processor.

4. The system according to claim 3, further comprising a controller in communication with the processor, the controller being configured to receive a signal from the processor indicative of the malfunction of the respective mobile device and further configured to control at least one of the respective mobile device or an environmental factor of the first location in response to receiving the signal from the processor.

5. The system according to claim 1, wherein at least one of the monitoring devices is configured to physically move to obtain multiple fields of view of the one or more mobile devices.

6. The system according to claim 1, wherein the one or more monitoring devices are configured to monitor a power usage of the one or more mobile devices.

7. A method of monitoring a mobile test device, comprising:

configuring a monitoring device comprising an imaging sensor to monitor the mobile test device;

communicating, by one or more processors, with one or more communication ports of the mobile test device to control the mobile test device during testing;

collecting, by the one or more processors, a signal from the monitoring device during testing, the signal being indicative of a status of the mobile test device based upon an image captured by the imaging sensor;

determining, by the one or more processors, from the collected signal, a battery swell status of the mobile test device;

determining, by the one or more processors, whether the battery swell status of the mobile test device is within an acceptable threshold; and when the battery swell status of the mobile test device is not within an acceptable threshold, implementing, by the one or more processors, a corrective action related to the mobile test device.

8. The method according to claim 7, further comprising:

determining, by the one or more processors, that the battery swell status of the test device is not within the acceptable threshold; and determining, by the one or more processors, the corrective action based on the battery swell status of the test device.

9. The method according to claim 7, wherein the signal from the monitoring device comprises information regarding the image captured by the imaging sensor.

10. The method according to claim 7, wherein the corrective action comprises at least one of the following: discontinuing testing involving the mobile test device or shutting down the mobile test device.

11. The method according to claim 7, wherein the signal from the monitoring device comprises an indication of a malfunction of the test device.

12. The method according to claim 7, wherein collecting the signal from the monitoring device further comprises causing, by the one or more processors, the monitoring device to physically move to obtain multiple fields of view of the test device.

13. The method according to claim 7, wherein the monitoring device is configured to monitor a power usage of the mobile test device, and wherein the signal indicative of the status of the mobile test device indicates the power usage of the mobile test device.

14. A tangible, non-transitory computer-readable medium storing executable instructions for monitoring a mobile test device that, when executed by one or more processors of a computer system, cause the computer system to:

configure a monitoring device comprising an imaging sensor to monitor the mobile test device;

communicate with one or more communication ports of the mobile test device to control the mobile test device during testing;

collect a signal from the monitoring device during testing, the signal being indicative of a status of the mobile test device based upon an image captured by the imaging sensor;

determine a battery swell status of the mobile test device from the collected signal;

determine whether the battery swell status of the mobile test device is within an acceptable threshold; and when the battery swell status of the mobile test device is not within an acceptable threshold, implement a corrective action related to the mobile test device.

15. The tangible, non-transitory computer-readable medium of claim 14, wherein the executable instructions further cause the computer system to:

determine that the battery swell status of the test device is not within the acceptable threshold; and determine the corrective action based on the battery swell status of the test device.

16. The tangible, non-transitory computer-readable medium of claim 14, wherein the signal from the monitoring device comprises information regarding the image captured by the imaging sensor.

17. The tangible, non-transitory computer-readable medium of claim 14, wherein the signal from the monitoring device comprises an indication of a malfunction of the test device.

18. The tangible, non-transitory computer-readable medium of claim 14, wherein the signal indicative of the status of the mobile test device indicates the power usage of the mobile test device.

19. The tangible, non-transitory computer-readable medium of claim 14, wherein the corrective action comprises at least one of the following: discontinuing testing involving the mobile test device or shutting down the mobile test device.

\* \* \* \* \*